United States Patent [19]

Morita

[11] Patent Number: 4,697,933

[45] Date of Patent: Oct. 6, 1987

[54] FLUID BEARING ASSEMBLY

[75] Inventor: Kunihiko Morita, Koganei, Japan

[73] Assignee: Nippon Thompson Co., Ltd., Tokyo, Japan

[21] Appl. No.: 846,326

[22] Filed: Mar. 31, 1986

[51] Int. Cl.$^4$ .................. F16C 32/06; F16C 37/00

[52] U.S. Cl. ................................ 384/12; 384/100; 384/900

[58] Field of Search ............... 384/8, 9, 12, 13, 99, 384/100, 111, 113, 114, 115, 118, 120, 274, 278, 900, 627, 905

[56] References Cited

U.S. PATENT DOCUMENTS

| 3,124,395 | 3/1964 | Sternlight | 384/114 X |
| 3,193,054 | 7/1965 | Flaherty | 384/100 X |

FOREIGN PATENT DOCUMENTS

| 621004 | 5/1961 | Canada | 384/397 |
| 1477416 | 10/1969 | Fed. Rep. of Germany | 384/13 |
| 128524 | 8/1983 | Japan | 384/900 |
| 398772 | 9/1973 | U.S.S.R. | 384/627 |

Primary Examiner—Stuart S. Levy
Assistant Examiner—Thomas R. Hannon
Attorney, Agent, or Firm—Alan H. MacPherson; Richard Franklin; Thomas S. MacDonald

[57] ABSTRACT

A fluid bearing assembly includes a first element and a second element which moves relative to the first element along a predetermined path. The first element has a first surface which is opposite to a second surface of the second element. A recess is defined at least in either one of the first or second surfaces for maintaining therein a quantity of fluid, such as air and liquid. Also provided is a heater inside of the recess so that the fluid inside of the recess is heated to expand in volume, thereby pressurizing the fluid to establish alignment between the first and second elements. Such a fluid bearing assembly may be applied not only for the rotary type bearing assembly, but also for the linear motion type bearing assembly.

4 Claims, 7 Drawing Figures

FLUID BEARING ASSEMBLY

BACKGROUND OF THE INVENTION

1. Field of the Invention

This invention generally relates to a bearing assembly, and, in particular, to a fluid bearing assembly using fluid, such as air or liquid, as an intermediate layer between two elements which move relative to each other.

2. Description of the Prior Art

A bearing assembly is widely used as a machine part for providing a smooth rotational or sliding movement between two elements. A sliding contact type bearing assembly has to overcome a relatively large amount of friction present between the two elements. Because of this relatively large amount of friction, the two sliding elements produce significant heat and thus are subjected to high temperature, so that the material used to form the two sliding elements is limited. A rolling contact type bearing assembly is also used which includes rolling members interposed between two relatively moving elements. Thus, as compared with the sliding contact type bearing assembly, the rolling contact type bearing assembly is generally lower in friction and lower in production of heat. The rolling contact type bearing assembly may be used not only to provide a rotational relative motion between two elements, but also to provide a linear relative motion between two elements. However, in the case of a linear motion application of the rolling contact type bearing assembly, there must be provided an endless path to allow the rolling members to circulate therealong idenfinitely, and, thus, the overall structure tends to be rather complicated. Accordingly, there has been a need to develop a new bearing assembly simple in structure, low in production of heat, and easy for applications to linear as well as rotational relative motion.

SUMMARY OF THE INVENTION

In accordance with the prinicples of the present invention, there is provided a fluid bearing assembly including a first element having a first surface, a second element having a second surface facing said first surface, reservior means provided in at least either one of said first and second surfaces for maintaining therein a quantity of fluid, and heating means for heating said fluid so as to have the fluid in said reservoir means pressurized. Preferably, the reservoir means includes at least one recess formed in at least either one of said first and second surfaces. It is also preferable to provide supplying means for supplying the fluid into said reservoir means. At least one of the first and second elements is preferably comprised of a heat-resistant material, such as ceramic.

It is therefore a primary object of the present invention to provide a novel fluid bearing assembly high in performance and accuracy.

Another object of the present invention is to provide a fluid bearing assembly simple in structure and thus easy and inexpensive to manufacture.

A further object of the present invention is to provide a fluid bearing assembly capable of being easily implemented for both linear and rotational motion applications.

A still further object of the present invention is to provide a fluid bearing assembly extremely low in friction between two relatively moving elements and thus significantly low in the production of heat.

Other objects, advantages and novel features of the present invention will become apparent from the following detailed description of the invention when considered in conjunction with the accompanying drawings.

BRIEF DESCRIPTION OF THE DRAWINGS

FIG. 1b is a transverse, cross-sectional view of the fluid bearing assembly shown in FIG. 1a;

DESCRIPTION OF THE PREFERRED EMBODIMENTS

Figure 1A:
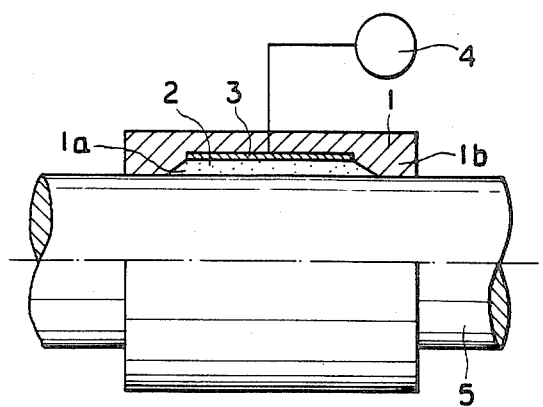
FIG. 1a is a schematic illustration showing a fluid bearing assembly of the rotary motion type constructed in accordance with one embodiment of the present invention.
Figure 1B:
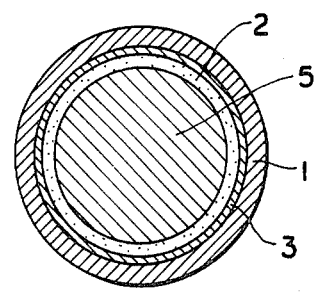

Referring now to FIGS. 1a and 1b, there is schematically shown a fluid bearing assembly of the rotary motion type constructed in accordance with one embodiment of the present invention. As shown, the fluid bearing assembly includes an outer cylinder 1 preferably comprised of a heat-resistant material, such as ceramic, and it is fitted onto a shaft 5. In the illustrated embodiment, the outer cylinder 1 has an inner peripheral surface which faces the outer peripheral surface of the shaft 5, and a predetermined clearance is provided between the opposed peripheral surfaces of the outer cylinder 1 and the shaft 5. The inner peripheral surface of the outer cylinder 1 is provided as engraved with a circumferential recess 1a which defines a reservoir for maintaining a quantity of fluid 2, such as air or liquid. In the illustrated embodiment, only one circumferential recess 1a is provided, but two or more such a circumferential recesses 1a may be provided, if desired. The recess 1a of the illustrated embodiment is continuous in the circumferential direction, but the recess 1a may be discontinuous in the circumferential direction, if desired, or the recess 1a may change in shape in the circumferential direction. Furthermore, the recess 1a is provided in the inner peripheral surface of the outer cylinder 1, but such a recess may also be provided additionally or alternatively on the peripheral surface of the shaft 5, if desired.

In the embodiment illustrated in FIGS. 1a and 1b, the circumferential recess 1a is provided in the inner peripheral surface of the outer cylinder 1 at the center thereof, so that there is defined a pair of ridges or flanges 1b, 1b one at each end. Thus, a predetermined clearance exists between the top surface of each of the ridges 1b, 1b, which define the inner peripheral surface of the outer cylinder 1, and the peripheral surface of the shaft 5, so that a rotational motion may be provided between the outer cylinder 1 and the shaft 5. If desired, one of the outer cylinder 1 or shaft 5 may be set stationary with the other rotating with respect thereto. Also provided in the fluid bearing assembly shown in FIGS. 1a and 1b is a heater member 3 which is disposed as attached to the bottom of the circumferential recess 1a. The heater member 3 is preferably comprised of a material having a high thermal conductivity, such as copper alloy or ceramic. A heater controller 4 is connected to the heater member 3, and, thus, the temperature of the heater member 3 is controlled by the heater controller 4. Preferably, the heater controller 4 is electrically connected to the heater member 3 and the heater member 3 receives electrical current to produce heat by Joule heating. As described above, since the recess 1a is defined as a reservoir to maintain therein a quantity of fluid 2 and both ends of the outer cylinder 1 are provided with ridges 1b, 1b which are separated away from the peripheral surface of the shaft 5 only by a predetermined clearance, the fluid 2 tends to be prevented from flowing out of the cavity 1a. Under this condition, when the heater member 3 is activated to produce heat, the fluid 2 contained in the recess 1a becomes heated and thus expands, thereby becoming pressurized. When the fluid 2 is pressurized by expansion, the outer cylinder 1 is properly aligned with the shaft 5. Under this condition, a proper clearance is defined between the outer cylinder 1 and the shaft 5 so that the friction therebetween during relative rotational motion is minimized.

In the preferred embodiment, there is provided means for detecting the pressure of the fluid 2 inside of the recess 1a and/or means for detecting the temperature of the fluid 2 inside of the recess 1a, and the operation of the heater controller 4 is controlled in response to the pressure and/or temperature of the fluid 2 inside of the recess 1a. With the structure of this preferred embodiment, the temperature and/or pressure of the fluid 2 inside of the recess 1a is always monitored and the activation of the heater member 3 is controlled in accordance with the monitored condition, so that the pressure of the fluid 2 inside of the recess 1a may be maintained at a predetermined level, thereby providing a stable and constant performance.

Figure 1C:
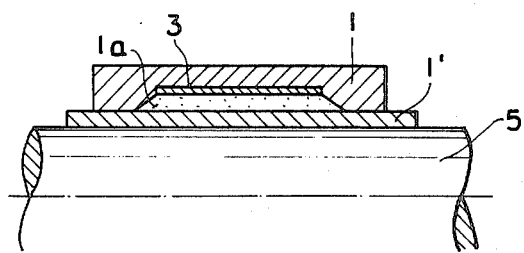
FIG. 1c is a partial, schematic illustration showing another fluid bearing assembly constructed by modifying the structure shown in FIGS. 1a and 1b.

FIG. 1c shows a modified structure in which an inner cylinder 1' is tightly fitted onto the shaft 5 and the outer cylinder 1 is loosely fitted onto the inner cylinder 1' thereby providing a predetermined clearance between the end ridges 1b, 1b of the outer cylinder 1 and the inner cylinder 1'. In this case, the inner cylinder 1' is integrally combined with the shaft 5 so that it rotates together with the inner cylinder 1'. With this structure, even if the shaft 5 is comprised of steel or any other material having a high thermal conductivity, the shaft 5 may be prevented from being significantly heated because the heated fluid 2 does not come into direct contact with the shaft 5. The inner cylinder 1' is preferably comprised of a heat-resistant material, such as ceramic. It should be noted, however, that the shaft 5 itself may also be comprised of a heat-resistant material, such as ceramic, if desired. In the embodiment shown in FIG. 1c, the outer cylinder 1 is structurally the same as that shown in FIGS. 1a and 1b.

Figure 2:
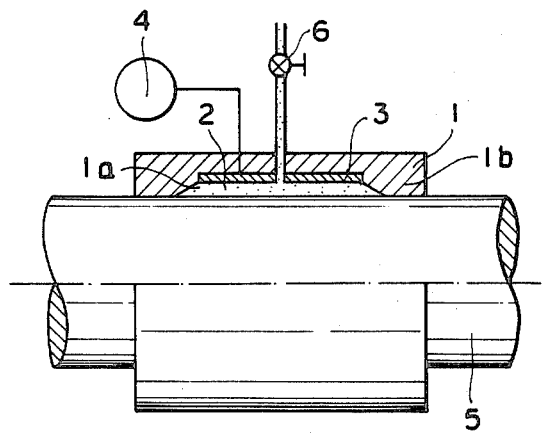
FIG. 2 is a schematic illustration showing a fluid bearing assembly constructed in accordance with another embodiment of the present invention.

Referring now to FIG. 2, there is shown another embodiment of the rotating type fluid bearing assembly according to the present invention. As will become clear later, this embodiment is suitable for use in high load applications. As shown in FIG. 2, the overall structure of this embodiment is similar to that shown in FIGS. 1a and 1b, and the only difference resides in the provision of a fluid supply pipe having a valve 6. That is, the fluid supply pipe is in fluidic communication with the chamber or recess 1a at one end and in fluidic communication with a fluid source (not shown) which is typically provided with a pump. Thus, the fluid 2 may be supplied under pressure to the chamber 1a when the valve 6 is opened. Preferably, a detector is provided to detect the volume of the fluid 2 present in the chamber 1a and the valve 6 is operated in response to a signal supplied from such a detector so as to maintian the volume of the fluid 2 in the chamber 1a at a predetermined level.

Such a structure is particularly useful when a load applied to the shaft 5 or the fluid bearing assembly itself is relatively large because the fluid 2 inside of the chamber 1a needs to be pressurized more as to maintain the fluid 2 at a higher pressure level. However, at such an elevated pressure level, the fluid 2 inside of the chamber 1a tends to leak through the clearance between the outer cylinder 1 and the shaft 5. And, if the fluid 2 leaks away, the pressure of the fluid 2 inside of the chamber 1a decreases. Thus, in accordance with this embodiment, when the fluid 2 has leaked beyond a predetermined limit, the valve 6 is opened to supply fresh fluid into the chamber 1a and, then, after closing the valve 6, the heater member 3 is activated to heat the fluid 2 inside of the chamber 1a until it reaches a predetermined level. With such a structure and function, the amount and pressure of the fluid 2 within the chamber 1a may be maintained at a predetermined level at all times so that a stable and constant performance may be secured. It is to be noted that although not shown specifically, it is preferably so structured that the opening and closing of the valve 6 is controlled automatically in accordance with the conditions, such as pressure and volume, of the fluid 2 inside of the chamber 1a.

Figure 3A:
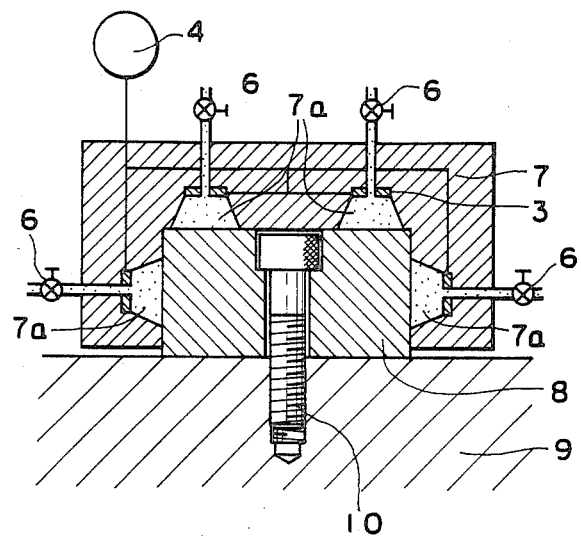
FIG. 3a is a schematic illustration showing in cross section a fluid bearing assembly of the linear motion type constructed in accordance with another embodiment of the present invention.

Referring now to FIG. 3a, there is shown a fluid bearing assembly of the linear motion type constructed in accordance with a further embodiment of the present invention. As will be understood, this embodiment is in principle similar in structure to the embodiments described above. That is, as shown in Fig. 3a, the linear motion type fluid bearing assembly includes a rail 8 extending straight in a direction perpendicular to the plane of the drawing, and the rail 8 is preferably comprised of a heat-resistant material, such as ceramic, and fixedly mounted on a bed 9 by means of a bolt 10. The assembly also includes a slide or table 7 which is provided as straddling the rail 8 so that the table 7 may move along the rail 8 along the longitudinal direction thereof. The table 7 is also preferably comprised of a heat-resistant material, such as ceramic.

In the embodiment illustrated in FIG. 3a, the rail 8 is rectangular in cross section and the table 7 has a generally U-shaped cross section, and the table 7 is inverted and slidingly mounted on the rail 8 in a straddling fashion. Thus, the rail 8 has a top surface and a pair of side surfaces; on the other hand, the table 7 similarly has a bottom surface when oriented in the shape of inverted-U in cross section and a pair of inner side surface, whereby the bottom surface of the table 7 faces the top surface of the rail 8 and each of the inner side surfaces of the table 7 faces the corresponding one of the side surfaces of the rail 8. It is to be noted that a predetemined clearance should be provided at least between the two opposing side surfaces of the table 7 and the rail 8, so that the table 7 can move along the rail 8 slidingly without physical contact bwtween the table 7 and rail 8 when in operation. In the illustrated embodiment, each of the bottom and side surfaces of the table 17 is provided with at least one chamber 7a in the form of a recess as a reservoir for maintaining therein a quantity of fluid 2. Similarly with the previous embodiments, the chamber 7a is generally trapezoidal in shape. In the illustrated embodiment, two such chambers 7a, 7a are formed in the bottom surface of the table as arranged side-by-side and spaced apart from each other, and each of the inner side surfaces of the table 7 is provided with a chamber 7a. It is to be noted that each chamber 7a is elongated in shape in the direction perpendicular to the plane of the drawing.

As described previously, each of the chambers 7a serves as a reservoir for maintaining therein a quantity of fluid 2 and is in fluidic communication with a source (not shown) of fluid 2 through an individual valve 6. Thus, when the associated valve 6 is opened, the fluid 2 is supplied from the source under pressure to the corresponding chamber 7a. For this purpose, the table 7 is provided with a plurality of supply holes 7b (FIG. 3b) each of which is in fluidic communication with the corresponding chamber 7a. In the illustrated embodiment, a plurality (or four to be exact) of such supply holes 7b are provided for the associated chamber 7a, and each of the supply holes 7b is connected to the source through an individual supply pipe provided with the valve 6. Thus, in the preferred embodiment, at first, the valves 6 associated with the supply holes 7b1 in the first row and the supply holes 7b3 in the third row are opened at the same time to supply the fluid 2 to the respective chambers 7a, and, then, the valves 6 associated with the other supply holes 7b are opened at the same time to supply the fluid 2 to the respective chambers 7a, and, by repeating these two steps alternatively, the volume of the fluid 2 in each of the chambers 7a may be maintained at a predetermined level. Such a structure is particularly advantageous for securing a stable performance because the fluid 2 can be distributed uniformly along the entire elongated chamber 7a.

Similarly with the previously described embodiments, each of the chambers 7a is provided with a heater member 3 as fixedly attached to the bottom of the chamber 7a, and each of the heater members 3 is operatively coupled to the heater controller 4. Thus, when the heater member 3 is activated, the fluid 2 inside of the chamber 7a is heated to become pressurized. Although not shown specifically, it is also preferable to provide a feed-back system in the present embodiment. That is, a pressure and/or temperature detector may be provided to detect the current condition of the fluid 2 inside of the associated chamber 7a and the activation of the heater member 3 is controlled in response to the detected condition. Since such a structure is obvious for one skilled in the art, it is not shown in detail.

Figure 3B:
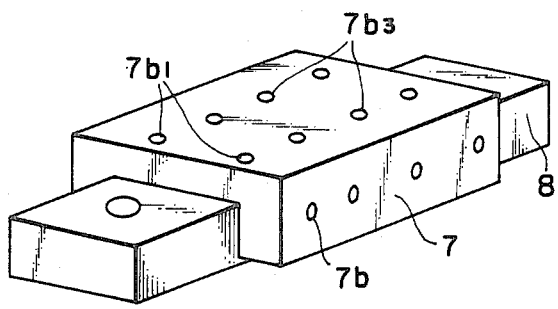
FIG. 3b is a schematic illustration showing in perspective view the overalll appearance of the fluid bearing assembly shown in FIG. 3aand
Figure 4:
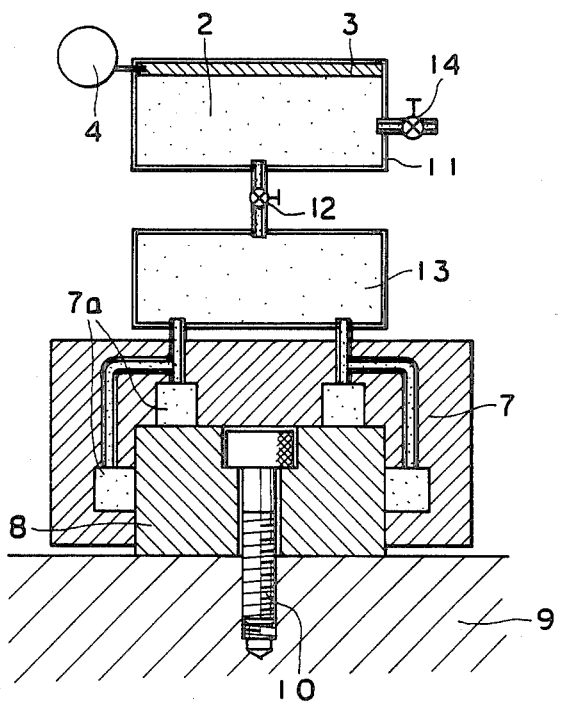
FIG. 4 is a schematic illustration showing a fluid bearing assembly constructed by modifying the structure shown in FIGS. 3a and 3b.

FIG. 4 schematically shows a linear motion type fluid bearing assembly which may be easily constructed by modifying the structure shown in FIGS. 3a and 3b. As shown in FIG. 4, the illustrated assembly includes a rail 8, extending straight over a desired distance in the direction perpendicular to the plane of the drawing and fixedly attached to a bed 9 by means of a bolt 10, and a table 7 which is slidably mounted on the rail 8 in a straddling fashion. The table 7 is provided with four elongated chambers 7a, two at the bottom surface and one at each of the pair of inner sides surfaces, each of which is commonly in fluidic communication with a plenum chamber 13, which, in turn is in fluidic communication with a working chamber 11 through a valve 12. The working chamber 11 is filled with working fluid 2 and is provided with a heater member 3 which is operatively connected to a heater controller 4. The working chamber 11 is also provided with a supply valve 14 through which the fluid 2 may be replenished to the working chamber 11 from a fluid source (not shown).

In operation, when the heater member 3 is activated under the control of the heater controller 4 with the valve 14 closed, the fluid 2 inside of the working chamber 11 is heated to expand and thus the pressure of the fluid 2 inside of the working chamber 11 increases. When the fluid pressure reaches a predetermined level, the intermediate valve 12 is opened so that the heated fluid 2 under pressure is supplied from the working chamber 11 to each of the chambers 7a through the plenum chamber 13. Since a predetermined clearance exists between the table 7 and the rail 8, the fluid 2 inside of the chambers 7a gradually leaks away, and, when the pressure inside of the plenum chamber 13 has decreased to a predetermined level, the intermediate valve 12 is opened so that the heated fluid 2 at high pressure is replenished to the plenum chamber 13 from the working chamber 11. The intermediate valve 12 is closed when the plenum chamber 13 has reached a predetermined level. In this manner, the pressure condition of the fluid inside each of the chambers or recesses 7a is maintained at a predetermined level, thereby maintaining a predetermined clearance between the table 7 and the rail 8. On the other hand, when the pressure or volume of the fluid 2 inside of the working chamber 11 has decreased to a predetermined level, the supply valve 14 is opened to supply fresh fluid 2 into the working chamber 11. It is to be noted that the operation of the valves 12 and 14 and of the heater member 3 in response to the pressure, temperature and/or volume of the fluid 2 as described above may be easily carried out by using well know elements, such as detectors and motors, by one skilled in the art.

As described above, in accordance with the present invention, there is provided a fluid bearing assembly which may be set in operation by utilizing only thermal expansion of working fluid, such as air or liquid, and, therefore, the assembly may be made extremely simpler in structure and lighter in weight.

While the above provides a full and complete disclosure of the preferred embodiment of the present invention, various modifications. alternate constructions and equivalents may be employed without departing from the true spirit and scope of the invention. Therefore, the above description and illustration should not be construed as limiting the scope of the invention, which is defined by the appended claims.

What is claimed is:

1. A fluid bearing assembly comprising:
   a first element having a first surface;
   a second element having a second surface facing said first surface with said fluid sandwiched therebetween;
   reservoir means provided in at least either one of said first and second surfaces for maintaining therein a quantity of fluid, wherein said reservoir means includes at least one recess formed in at least one of said first and second surfaces;

said reservoir means further comprising a plenum chamber in fluidic communication with said recess and a working chamber in fluidic communication with said plenum chamber through an intermediate valve; and heating means for heating said fluid so as to have the fluid in said reservoir means pressurized;

wherein said first element is a rail extending straight over a predetermined distance and having at least one first flat surface as said first surface and said second element is a table which is mounted on said rail in a straddling manner and has at least one second flat surface as said second surface, whereby said table may move along said rail with said fluid sandwiched therebetween.

2. The assembly of claim 1 further comprising heating means for heating the fluid inside of said working chamber.

3. The assembly of claim 2 wherein said heating means includes a heater member disposed inside of said working chamber and a heater controller operatively connected to said heater member.

4. The assembly of claim 3 wherein said working chamber is provided with a supply valve through which said fluid may be replenished into said working chamber.

* * * * *